US009077598B2

(12) United States Patent
Waller et al.

(10) Patent No.: US 9,077,598 B2
(45) Date of Patent: *Jul. 7, 2015

(54) DIGITAL SIGNAL TRANSMISSION AND RECEPTION

(71) Applicant: Sony Corporation, Minato-ku (JP)

(72) Inventors: Arthur Simon Waller, Basingstoke (GB); Lothar Stadelmeier, Stuttgart (DE); Dietmar Schill, Winnenden (DE); Antonio Alarcon Gonzalez, Viladecans (ES)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,348

(22) Filed: Jan. 28, 2014

(65) Prior Publication Data
US 2014/0139747 A1 May 22, 2014

Related U.S. Application Data

(63) Continuation of application No. 12/478,291, filed on Jun. 4, 2009, now Pat. No. 8,687,716.

(30) Foreign Application Priority Data

Jun. 4, 2008 (EP) .................................... 08157548
Jun. 13, 2008 (GB) .................................. 0810950.6
Jun. 13, 2008 (GB) .................................. 0810962.1

(51) Int. Cl.
H04K 1/10 (2006.01)
H04L 27/26 (2006.01)
(Continued)

(52) U.S. Cl.
CPC ........... H04L 27/2626 (2013.01); H04L 5/0007 (2013.01); H04L 5/0044 (2013.01);
(Continued)

(58) Field of Classification Search
USPC ................ 375/260, 326, 327; 455/192.2, 450
See application file for complete search history.

(56) References Cited

U.S. PATENT DOCUMENTS 6,172,993 B1  1/2001  Kim et al.
7,627,047 B2  12/2009 Tsuruta et al.
(Continued)

FOREIGN PATENT DOCUMENTS

CN  101175060 A  5/2008
EP  0 732 832 A1  9/1996
(Continued)

OTHER PUBLICATIONS

Eurasian Office Action issued Sep. 30, 2011, Patent Application No. 200900655 (with English Translation).
(Continued)

Primary Examiner — Eva Puente
(74) Attorney, Agent, or Firm — Oblon, McClelland, Maier & Neustadt, L.L.P.

(57) ABSTRACT

A digital signal transmitter in which multiple data streams are each transmitted by modulation of a respective frequency band within one of a group of frequency channels, the frequency bands each occupying no more than a predetermined maximum bandwidth less than or equal to the channel width; comprises means for transmitting at respective frequency positions within each frequency channel, one or more instances of band information defining the frequency bands corresponding to all of the data streams carried within that frequency channel, the one or more instances being arranged so that any portion of the frequency channel equal in extent to the predetermined maximum bandwidth includes at least one instance of the band information.

22 Claims, 5 Drawing Sheets

(51) Int. Cl.
*H04L 25/02* (2006.01)
*H04N 5/44* (2011.01)
*H04N 21/4385* (2011.01)
*H04L 5/00* (2006.01)
*H04N 21/2383* (2011.01)
*H04N 21/434* (2011.01)
*H04N 21/438* (2011.01)

(52) U.S. Cl.
CPC ............ *H04L 5/005* (2013.01); *H04L 5/0092* (2013.01); *H04L 25/0226* (2013.01); *H04L 27/2613* (2013.01); *H04L 27/2602* (2013.01); *H04L 27/2666* (2013.01); *H04N 21/2383* (2013.01); *H04N 21/4345* (2013.01); *H04N 21/4383* (2013.01); *H04N 5/4401* (2013.01); *H04N 21/4385* (2013.01); *H04L 27/2647* (2013.01)

(56) References Cited

U.S. PATENT DOCUMENTS

| | | | |
|---|---|---|---|
| 7,957,480 | B2 | 6/2011 | Egashira et al. |
| 8,467,331 | B2* | 6/2013 | Lakkis ................... 370/319 |
| 2004/0151109 | A1* | 8/2004 | Batra et al. ............. 370/208 |
| 2007/0268975 | A1 | 11/2007 | Yoon et al. |
| 2008/0095255 | A1 | 4/2008 | Tanaka et al. |
| 2008/0101275 | A1 | 5/2008 | Kang et al. |
| 2008/0107011 | A1 | 5/2008 | Yang |
| 2008/0188233 | A1* | 8/2008 | Borran et al. .................. 455/450 |

FOREIGN PATENT DOCUMENTS

| | | |
|---|---|---|
| EP | 0 802 644 A2 | 10/1997 |
| EP | 1 650 921 A2 | 4/2006 |
| EP | 1 746 855 A2 | 1/2007 |
| EP | 1 764 934 A2 | 3/2007 |
| EP | 1 919 151 A1 | 5/2008 |
| EP | 1 976 317 A1 | 10/2008 |
| JP | 7-79207 | 3/1995 |
| JP | 2007-221745 | 8/2007 |
| RU | 2 296 435 C2 | 3/2007 |
| WO | WO 2005/041515 A1 | 5/2005 |
| WO | WO 2007/037657 A2 | 4/2007 |
| WO | WO 2007/083569 A1 | 7/2007 |

OTHER PUBLICATIONS

Chinese Office Action issued Oct. 9, 2011, in Patent Application No. 200910159545.6 (English-Language Translation).

Office Action issued Feb. 10, 2011, in China Patent Application No. 200910159545.6 (with English Translation).

Office Action issued Mar. 22, 2012, in European Patent Application No. 09 251 478.5.

BBC, Nokia & Teracom. "DVB-T2 Concept", XP 17817443, Jun. 2007, 73 pages.

Office Action issued Apr. 21, 2015 in Korean Patent Application No. 10-2009-49494 (English translation only).

* cited by examiner

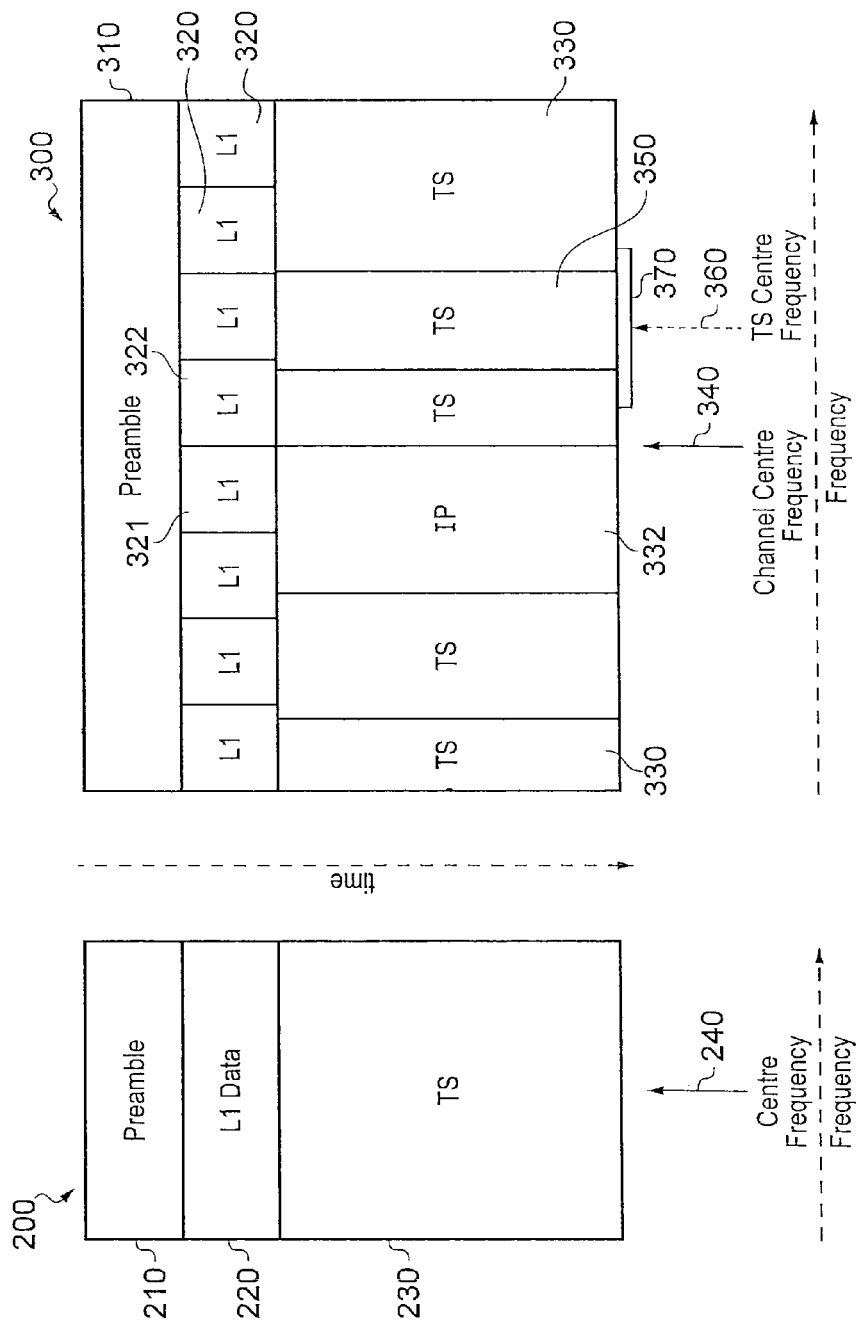

DIGITAL SIGNAL TRANSMISSION AND RECEPTION

CROSS REFERENCE TO RELATED APPLICATIONS

The present application is a continuation application of U.S. patent application Ser. No. 12/478,291, filed Jun. 4, 2009, and claims priority to United Kingdom Applications 0810962.1, filed on 13 Jun. 2008, and 0810950.6, filed on 13 Jun. 2008, and European Patent Application 08157548.2, filed 4 Jun. 2008. The contents of the above applications are incorporated herein by reference in their entirety.

FIELD

This disclosed inventions relate to digital signal transmission and reception.

DESCRIPTION OF THE PRIOR ART

Digital signals are transmitted in applications such as digital television broadcasting. Standards such as the so-called DVB standards have existed since the 1990s, and provide a range of quadrature amplitude modulation (QAM) schemes for broadcast services, along with formats for the transmission of accompanying control data and metadata. These standards define both the radio frequency (RF) techniques used to carry the data and the way in which the data representing different broadcast services is organised into packets and streams for transmission.

The DVB standards are described extensively elsewhere, so only a brief summary will now be given, with reference to the standards relating to the transmission of broadcast cable services, although it will of course be appreciated that similar considerations can apply to (for example) digital satellite services and terrestrially broadcast services.

In basic terms, the video data, audio data and accompanying data corresponding to a broadcast programme are multiplexed into an MPEG-2 Programme Stream (PS). One or more PSs are multiplexed to form a transport stream (TS) formed as a sequence of fixed length data packets. The bit rate of the TS can range between about 6 Mbit/s and 64 Mbit/s depending on parameters such as the modulation scheme in use (16QAM to 256QAM for example) and the bandwidth of the broadcast channel which will be used to carry the TS.

With current technology, one broadcast channel (with a bandwidth of a few MHz-up to 8 MHz) carries one TS. The TS includes packetised programme data (video, audio etc.) and packetised control data defining the different programmes carried by that TS. Optionally, a so-called network information table (NIT) is also carried, which provides information about the physical network, such as channel frequencies, service originator and service name.

There is a growing demand not only for more digital television services but also for higher quality (in terms of picture and audio resolution) services. This demand imposes pressure on the digital payload carried by each channel. It is a constant aim to use the available broadcast spectrum efficiently and flexibly.

SUMMARY OF THE INVENTION

This invention provides a digital signal transmitter in which multiple data streams are each transmitted by modulation of a respective frequency band within one of a group of one or more frequency channels, the frequency bands each occupying no more than a predetermined maximum bandwidth less than or equal to the channel width;

in which the transmitter comprises means for transmitting at respective frequency positions within each frequency channel, one or more instances of band information defining the frequency bands corresponding to all of the data streams carried within that frequency channel, the one or more instances being arranged so that any portion of the frequency channel equal in extent to the predetermined maximum bandwidth includes at least one instance of the band information.

Embodiments of the present invention conveniently allow channels of width greater than the receiver bandwidth, or the width of any individual payload stream, to be used, by providing a mechanism for indicating to a receiver where, within a frequency channel, it should align its receiver bandwidth in order to receive a desired data stream.

Further respective aspects and features of the present invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 2 schematically illustrates a previously proposed data transmission frame;

FIG. 3 schematically illustrates a data transmission frame according to an embodiment of the present invention;

DESCRIPTION OF THE PREFERRED EMBODIMENTS

Figure 1:
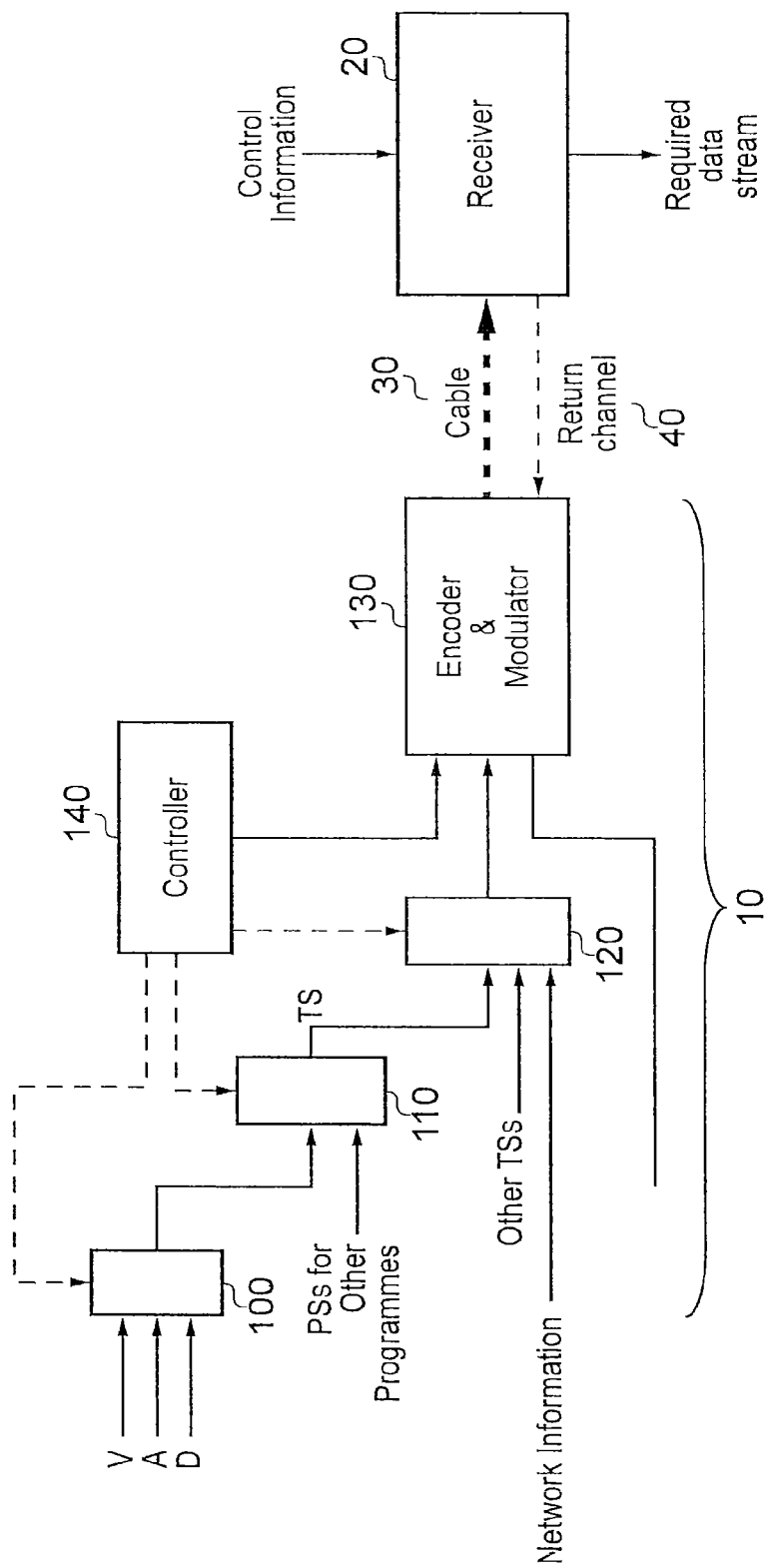
FIG. 1 schematically illustrates a digital signal transmission system.

Referring now to FIG. 1, a digital signal transmission system comprises a transmitter 10 and a receiver 20, linked by a transmission link 30. In this example, the transmission link is a wired link (which term encompasses electrically conductive wires and optical fibres), and the system of FIG. 1 is arranged to provide a cable television service. In general terms, except where differences are described, the apparatus operates in accordance with the DVB-C standards.

An optional return channel 40, by which data such as purchasing data or viewing statistics can be carried from the receiver to the transmitter, is also provided. The return channel is conventional and will not be described further here.

The present techniques are not limited to cable systems. Corresponding techniques may be used in other transmission systems such as terrestrial or satellite systems.

The transmitter comprises a number of programme multiplexers 100, one for each programme data stream to be transmitted. These multiplex video, audio and data streams relating to a programme into an MPEG-2 programme stream (PS). The PS is multiplexed by a transport multiplexer 110 with PSs for other programmes to form an MPEG-2 transport stream (TS). A TS is a basic digital stream carried by the system, and can have a bitrate generally in the range of about 6 to about 64 Mbit/s.

The TS is multiplexed with other TSs (or other input streams such as so-called Generic Encapsulated Streams, Generic Continuous Streams or Generic Fixed-Length Packetised Streams) and also network information (to be described later) by a multiplexer 120, with the resulting data being passed to an encoder and modulator 130.

The encoder and modulator 130 encompasses such functions as packetising, channel coding, data interleaving (by time and/or frequency), word length conversion, differential coding, QAM coding, frame generation, base-band filtering and radio frequency (RF) modulation such as OFDM modulation in which each payload stream is carried by modulated groups of (generally) adjacent sub-carriers. Except where described, these functions correspond to known functions of a DVB-C transmitter. (In a practical system there may well be multiple transmitters coupled to a combiner to generate a combined modulated RF signal). The modulated RF signal is passed to the cable 30 for transmission to one or more (and generally a large number of) receivers 20.

The transmitter 10 operates under the control of a controller 140. The functions carried out by the controller 140 (e.g. preparation of NIT and band information data) will be described below.

The receiver 20 will be described in more detail below, particularly with reference to FIG. 7. For now, it is sufficient to note that the receiver operates in accordance with control information to demodulate and decode a required data stream—for example, a particular TS—from the transmitted signal.

In operation, the transmitter 10 operates at a number of frequency channels. These lie generally within the range of about 40 to about 800 MHz. But the present techniques could apply to an arrangement having only one frequency channel. Within each channel, data are transmitted by OFDM modulation of multiple sub-carriers.

In previous systems the channels had a fixed width, for example 8 MHz, with each channel being adjacent in frequency (perhaps with a small guard band) to the next channel. FIG. 2 schematically illustrates a data transmission frame 200 within such a channel in a previous DVB-C system.

In FIG. 2, time is represented in a downwards vertical direction and frequency in a horizontal direction (both with respect to the orientation of the drawing). In a time order, the data frame 200 comprises:
(a) preamble data 210, which amongst other possible functions acts to mark the start of the data frame;
(b) layer 1 (L1) data which, amongst other possible functions identifies the subsequent data payload and provides physical layer parameters for use by receivers relating to the encoding of the data payload; and
(c) payload data—in this case a TS.

The data frame 200 occupies the whole channel width (8 MHz in this example). The receiver bandwidth would also correspond to this channel width. Accordingly, the receiver can be successfully aligned with a channel of this type simply by specifying the centre frequency of the channel. This centre frequency information can be provided in an optional Network Information Table (NIT) broadcast as part of each TS. Alternatively, the centre frequencies can be detected by a receiver carrying out an automated channel "sweep", in which the entire available frequency range is scanned to detect broadcast channels.

The present embodiment allows channels of different widths (e.g. 8, 16 or 32 MHz) to be used. However, the receiver bandwidth (and, correspondingly, the maximum allowed bandwidth by which a single payload data stream such as a TS can be carried) remains the same as with the previous systems, e.g. 8 MHz. In other words, the predetermined receiver bandwidth is less than or equal to the channel width. The techniques also allow multiple TSs or other types of payload to be carried within a single channel. FIG. 3, illustrating a DVB-C2 data transmission frame according to an embodiment of the present invention, will be used to explain how this technique operates.

Once again, time is represented in a downward vertical direction and frequency in a horizontal direction. A data frame 300 is (in this example) 32 MHz wide and starts with preamble data 310 similar to the preamble data 210.

After the preamble data there follow multiple instances of L1 data, at different frequency positions within the channel. The particular contents of the L1 data will be explained below, but with reference to the example of FIG. 3 it should be noted that 8 such instances are provided within a 32 MHz channel. In other words, each instance of the L1 data is provided by a group of adjacent OFDM sub-carriers which, taken as a group, occupy a band 4 MHz wide, though more generally each instance could be less than or equal to half of the receiver bandwidth, and there could be a correspondingly higher number of instances if the bandwidth of each instance was lower. (In fact, to avoid problems of attenuation at the extreme edges of filter passbands defining the channels, each instance of L1 would be very slightly less than 4 MHz wide, but for the purposes of the present description they will be referred to as being 4 MHz wide).

The eight instances of the L1 data (in this example) within a single 32 MHz channel are identical and, for convenience, are transmitted at the same time. The reason that the L1 data is transmitted in a bandwidth no greater than half that of the receiver bandwidth is that wherever the 8 MHz receiver bandwidth is aligned within the 32 MHz channel, the receiver bandwidth is bound to encompass at least one complete instance of the L1 data.

The multiple instances of the L1 data need not (when considered together) fill the whole channel width. There could be frequency gaps or guard bands between them. The constraint that the width of an individual instance should be less than or equal to half of the receiver bandwidth assumes that the receiver bandwidth is less than the channel width; if the receiver can in fact encompass the whole channel, then in principle only one instance would be required, and that constraint would not apply.

As before, there are two routes to the receiver locating a channel. One is via the NIT, and the other is through a frequency sweep as described above.

The NIT in this embodiment defines the centre frequency for each channel rather than defining frequency ranges for individual TSs within that channel. Each TS carried by a channel is described by the centre frequency of the channel, rather than by the centre frequency of the frequency band carrying the data stream representing that TS. In order to find the centre frequency of the frequency band for the relevant TS, the receiver first aligns its receiver bandwidth with the centre frequency 340 of the channel, then detects the next available instance of the L1 data (which in this case would be the next available transmission of either the instance 321 or the instance 322), then detects from the received L1 data the centre frequency and other receiver parameters (e.g. QAM parameters, identity of the sub-carrier streams, bandwidth etc) of the required TS. For example, if the required TS for a particular PS is the TS 350, the L1 data for that PS would specify at least (a) the TS; (b) the TS centre frequency 360; and (c) receiver parameters for the TS. Knowing the centre frequency and bandwidth, the receiver would align its receiver bandwidth 370 to ensure that it encompasses the band occupied by that TS.

If the required channel is located by a frequency sweep, then the mechanism for locating a TS is similar, in that the receiver aligns its bandwidth with any position within the channel and detects an instance of the L1 data. From this, the receiver can extract all of the information needed to receive the required TS, in the same way as just described.

The payload data 330 follows the L1 data. Multiple TSs can be carried by a single channel, along with other types of data such as IP data 332—an example of the more general data type known as "generic stream encapsulation" or GSE.

Figures 4, 5, 6:
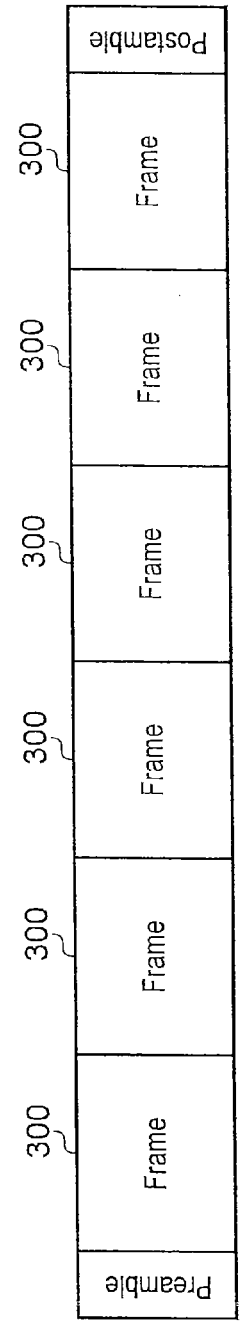
FIG. 4 schematically illustrates an L1 data packet.
FIG. 5 schematically illustrates a network information table.
FIG. 6 schematically illustrates a data superframe.

FIG. 4 schematically illustrates an instance of the L1 data. The L1 data has various existing functions within the DVB-C and MPEG standards, but here the specific functions to be described are that for each TS (e.g. the TSs: TS1 . . . 4), the L1 data defines: the centre frequency of each TS; the bandwidth of the TS; and receiver parameters for that TS.

FIG. 5 schematically illustrates a network information table (NIT). The NIT is transmitted as a data stream with a unique programme identifier PID. If it is transmitted at least once in each TS, it can therefore be extracted by reference to that PID. It is considered optional and proprietary in the context of the DVB-C standards, and as such can contain various types of data. But amongst such other possible functions, in the present context the NIT serves to identify the channel centre frequency (and, optionally, other parameter data) for each TS.

FIG. 6 schematically illustrates a data superframe relating to one channel.

The superframe is formed of multiple frames (such as the frame 300 shown in FIG. 3), preceded by preamble data and followed by postamble data. A further superframe would follow directly after the postamble data of a completed superframe. Each frame contains the multiple instances of the L1 data (i.e. spread across the frequency range relating to that channel and repeated in time at least once during the frame), which means that the instances of the L1 data are repeated periodically in time during the superframe. To put the periods into context, the frames have lengths measured in milliseconds, whereas a superframe can have a length measured in hours or even longer. So, the delay involved in establishing the correct TS and receiver parameters for a particular PS is of the order of one frame length.

The system is constrained so that changes to the L1 data occur only at superframe boundaries. It is possible for new values of the L1 data to be transmitted in the last few frames of a superframe, but not to have effect until the superframe boundary, in order to allow the receiver to prepare for (say) a retuning operation.

Figure 7:
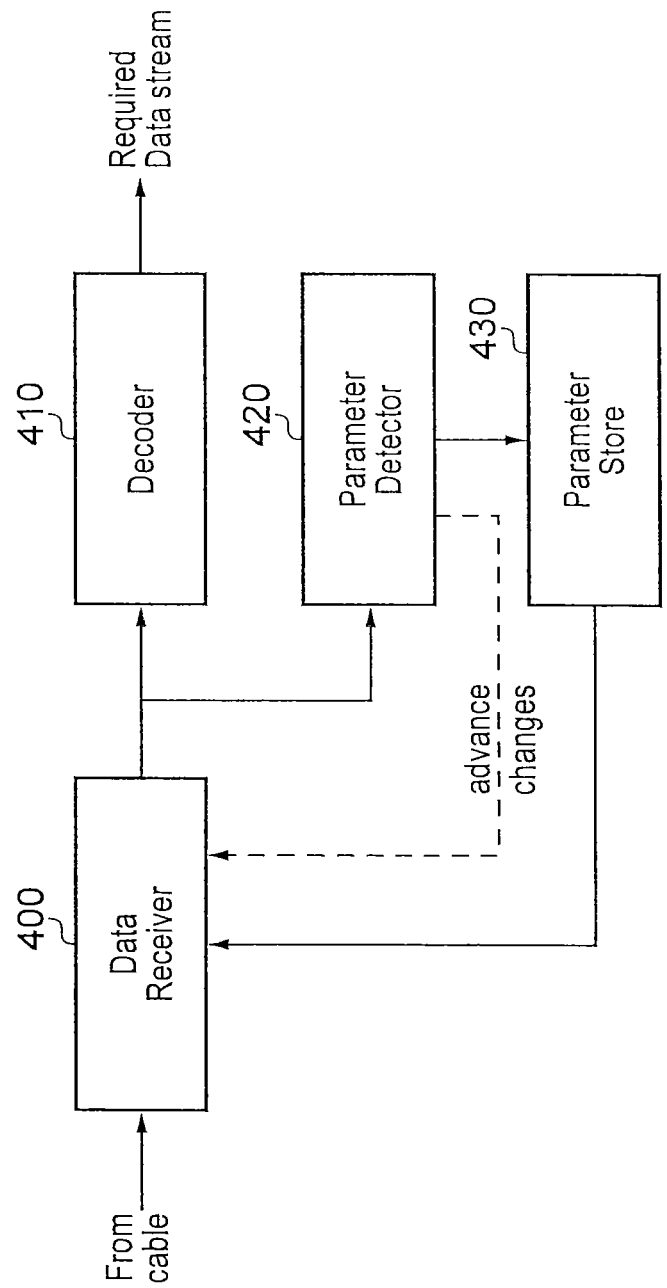
FIG. 7 schematically illustrates a receiver apparatus.

FIG. 7 schematically illustrates a receiver apparatus. The incoming cable signal is supplied to a data receiver which comprises a tuner (having in this example an 8 MHz bandwidth, though this may be adjustable as described below), a QAM demodulator and a channel decoder, which carries out such known operations as differential decoding, word length conversion, de-interleaving and the like to generate output data.

The data signal output by the data receiver 400 is passed to a decoder 410 and a parameter detector 420 associated with a parameter store 430.

The parameter detector 420 carries out the functions of detecting channel details from the NIT or from the sweep and detecting TS details from the L1 data. All of these details are stored in the parameter store 430 and used to control the data receiver 400. The way in which this is carried out will be summarised with respect to FIG. 9 below. A dashed line connection between the parameter detector 420 and the data receiver 400 indicates the possibility mentioned above of the parameter detector passing advance details towards the end of a superframe of changes in receiver parameters due to take effect at the end of the superframe.

The decoder 400 operates to decode the required PS stream once the appropriate receiver parameters have been set.

The data receiver 400 may have a variable bandwidth, within certain limits. For example, the data receiver 400 may have a bandwidth that is selectable between 8 MHz and 7 MHz—possibly to allow for legacy compatibility with different instances of previous DVB-C systems. Such a feature can in fact be used in connection with the present techniques, so that once the L1 data has defined parameters to receive the required data stream, the data receiver can set its receiver bandwidth to the lowest (or simply a low) setting (from amongst those values available to the data receiver) which still encompasses the required data stream, allowing of course for so-called roll-off which is a lessening of the data receiver's response at the edges of the data receiver's bandwidth. Where such a feature is used, the data receiver can for example set its bandwidth back to a higher level (if that is indeed necessary given the width of each instance of the L1 data) whenever the L1 data specifically needs to be accessed.

Figure 8:
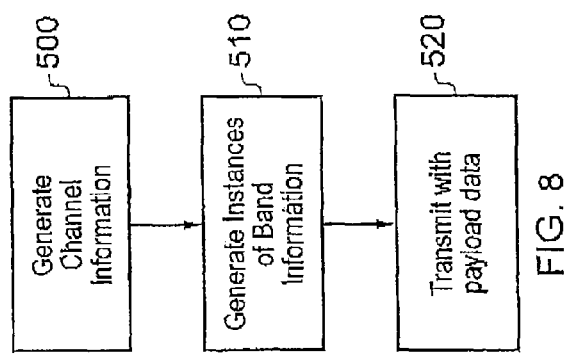
FIG. 8 schematically illustrates a transmission method.

FIG. 8 is a schematic flow chart showing the operation of a transmitter.

In FIG. 8, steps 500 and 510 are (in this example) carried out by the controller 140, in which channel information (corresponding to the NIT data described above) and instances of band information (corresponding to the instances of the L1 data described above) are generated. Note that the generation of the NIT data is optional; the channels can be identified by a frequency sweep instead. At a step 520 these data are transmitted (a step carried out by the encoder and modulator 130).

Figure 9:
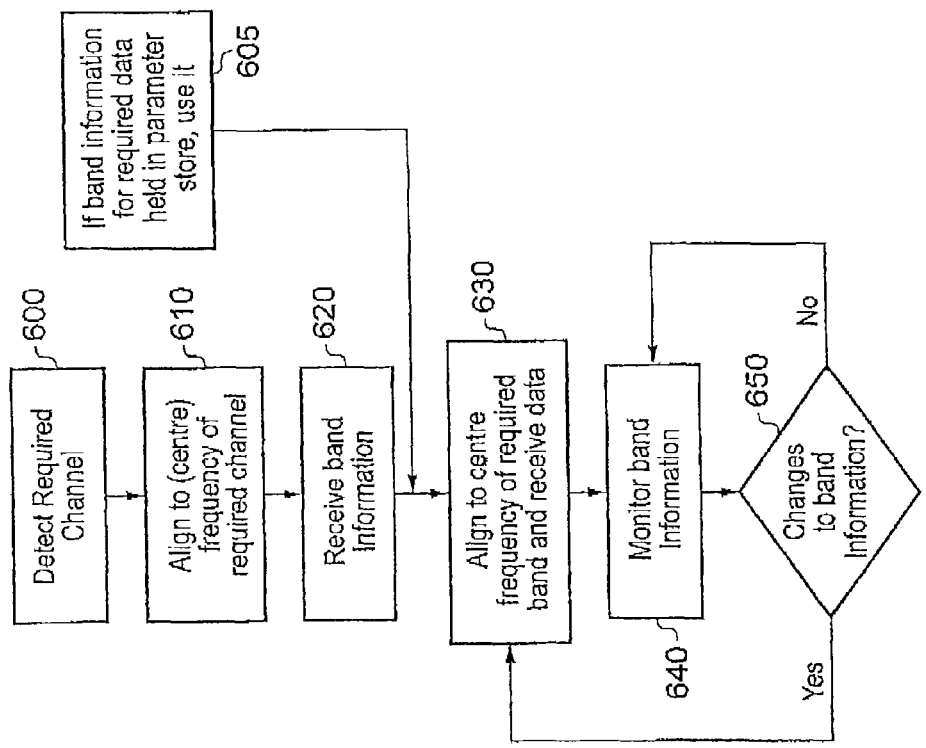
FIG. 9 schematically illustrates a reception method.

FIG. 9 is a schematic flow chart illustrating the operation of a receiver.

In FIG. 9, at a step 600 a required channel (for a desired output data stream) is detected. This could be by the parameter detector 420 examining the NIT data from within a currently detected channel, or it could be by a frequency sweep and then examination of the L1 data in the detected channels by the parameter detector.

At a step 610, the parameter detector 420 stores appropriate parameters for the required channel in the parameter store 430, and the data receiver 400 aligns its receiver bandwidth to the required channel—preferably to the centre frequency of the required channel. At a step 620 the parameter detector 420 receives band information (corresponding to the L1 data) for the required output data stream, via the data receiver, and stores appropriate parameters in the parameter store 430. The data receiver aligns its receiver bandwidth to the centre frequency of the required band (i.e. the portion of the channel containing the required payload data) at a step 630.

The payload data can then be received and decoded by the decoder 410 to produce the required output stream.

Note that in fact the L1 data may define a receiver centre frequency which is not in fact the centre frequency of the band containing the required payload data, but which is still such that the receiver, when centred around that receiver centre frequency, will still receive all of the sub-carriers relating to the required payload data. One example of why this might be done is where the required band is close to an edge of the channel, and there is a potentially interfering signal outside the channel but adjacent or near to that edge of the channel. Here, it could be beneficial for the receiver centre frequency defined by the L1 data to be offset away from the edge of the channel, so that the receiver is less likely to receive the interfering signal.

In the meantime the parameter detector continues to monitor the band information contained in successively transmitted instances of the L1 data at a step 640. In an embodiment, the bandwidth of the L1 data is such that whatever the centre frequency of the data receiver, it will always receive at least one full instance of the L1 data. However, in another embodiment, if the bandwidth of the L1 data and the receiver bandwidth and centre frequency are such that only (say) the higher sub-carriers of one instance of the L1 data and the lower sub-carriers of the next instance of L1 data are received, the data receiver can be arranged so as to re-order those received sub-carriers (e.g. after an FFT stage on the receiver side) into the order corresponding to a complete instance of the L1 data for demodulation and decoding.

At a step 650, if any changes to the band information are detected, control passes back to the step 630 so that the relevant receiver parameters can be adjusted. Otherwise, control passes back to the step 640 so that the monitoring process can continue.

The parameter store can be used to improve the operation of the receiver in a further way. Historically, a broadcast channel has carried one TS. The centre frequency of this channel was included in the NIT (if present) or was discovered by the receiver as part of a frequency sweep, and was stored in a database within the receiver against that TS. When a receiver needed to receive a TS, it would consult its database to find the centre frequency for that TS and send that information to the tuner as a tuner parameter.

In the embodiments described here, a TS can occupy a frequency band forming a subset of a frequency channel. If the receiver followed the historical approach described above, it would store the centre frequency of the channel and align its receiver bandwidth to that centre frequency whenever it required to receive a particular TS which makes up part (or all) of that channel. It would then need to read the L1 data as described above to find out the exact frequency band used by the TS, perhaps necessitating retuning to that frequency band (within the same channel) to be able to receive the correct frequency band. This two step operation would be required every time it needed to receive a TS.

Embodiments of the present invention provide a different way of performing this tuning operation. The first time that a TS is required, the receiver is tuned to the centre frequency of the channel so as to discover the frequency parameters for that TS, before (if necessary) retuning to the correct frequency band. However, once the frequency band for a TS (and, potentially, other receiver parameters) has been discovered from the L1 data, it is stored in the parameter store as a look-up record relating to that TS. This means that the next time that the receiver needs to receive that TS, it uses the information already stored in the parameter store to align directly with the frequency band used by that TS. This is represented by a step 605 in FIG. 9. Of course, the frequency band may have been modified since the details were stored in the parameter store, so the checks relating to the steps 640 and 650 are still carried out to verify that the receiver parameters detailed in the L1 data have not changed.

Note that because the instances of the L1 data within a channel are identical, the steps 640 and 650 can be carried out to verify parameters cached in the parameter store whenever the receiver is tuned to any TS in that frequency channel; not just when the receiver is tuned to a particular TS.

In this way, the receiver is caching (in the parameter store) the last known parameters for a TS, rather than the channel as notified in the NIT.

It will be appreciated that the apparatus and methods described above may be implemented, at least in part, by computing or data processing apparatus operating under the control of appropriate software commands. Such software, and data carriers which serve to provide such software, are therefore considered as embodiments of the invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A digital signal transmitter, comprising:
   first circuitry configured to generate multiple data streams, which are each transmitted by modulation of a respective frequency band of sub-carriers of one or more Orthogonal Frequency Division Multiplexed (OFDM) symbols, within one of a group of one or more frequency channels, the frequency bands each occupying no more than a predetermined maximum bandwidth less than or equal to a channel width,
   wherein the first circuitry is configured to generate, at respective frequency positions within each frequency channel, one or more instances of band information defining the frequency bands corresponding to all adjacent sub-carriers which are carrying payload data forming the data streams carried within that frequency channel, the one or more instances being arranged so that any portion of the frequency channel equal in extent to the predetermined maximum bandwidth includes at least one instance of the band information; and
   second circuitry configured to transmit the generated data streams.

2. The transmitter according to claim 1, wherein the second circuitry is further configured to transmit, for each of the data payloads, channel information defining the respective frequency channel, wherein the channel information defines a center frequency of the respective frequency channel, and the band information specifies the adjacent sub-carriers and their respective locations in the frequency channel.

3. The transmitter according to claim 1, wherein the second circuitry is further configured to transmit each instance of the band information at periodic time intervals.

4. The transmitter according to claim 3, wherein the data streams carried by a channel are arranged as data frames, each instance of the band information being transmitted at least once in each data frame.

5. The transmitter according to claim 3, wherein the second circuitry is further configured to transmit all instances of the band information at substantially a same time.

6. The transmitter according to claim 5, wherein
   multiple consecutive data frames are arranged as a data superframe; and
   the frequency bands used by the data streams are constrained so that changes in the band information may not occur within a superframe.

7. The transmitter according to claim 1, wherein each instance of the band information occupies a bandwidth no greater than half of the predetermined maximum bandwidth.

8. The transmitter according to claim 1, wherein the predetermined maximum bandwidth is less than the width of a frequency channel.

9. A digital signal transmission method, comprising:
transmitting by circuitry multiple data streams by modulation of a respective frequency band of sub-carriers of one or more Orthogonal Frequency Division Multiplexed, OFDM, symbols, within one of a group of one or more frequency channels, the frequency bands each occupying no more than a predetermined maximum bandwidth less than or equal to the a width; and
transmitting by the circuitry at respective frequency positions within each frequency channel, one or more instances of band information defining the frequency bands corresponding to all of the adjacent sub-carriers which are carrying payload data forming the data streams carried within that frequency channel, the one or more instances being arranged so that any portion of the frequency channel equal in extent to the predetermined maximum bandwidth includes at least one instance of the band information.

10. The method of claim 9, further comprising:
transmitting for each of the data payloads, channel information defining the respective frequency channel; in which the channel information defines a centre frequency of the respective frequency channel and the band information specifies the adjacent sub-carriers and their respective locations in the frequency channel.

11. A digital signal receiver, comprising:
first circuitry configured to receive a required data stream from a digital signal carrying multiple data streams by modulation of respective frequency bands of sub-carriers of one or more Orthogonal Frequency Division Multiplexed (OFDM) symbols, each within a respective one of a group of frequency channels, the frequency bands occupying no more than a predetermined receiver bandwidth less than or equal to a channel width, the digital signal carrying channel information defining a center frequency of each of the respective frequency channels and carrying, at respective frequency positions within each frequency channel and repeated from time to time, multiple instances of band information defining receiver parameters including at least the frequency bands corresponding to all of the groups of adjacent sub-carriers of the one or more OFDM symbols which are carrying data payloads of the data streams within that frequency channel, the instances being arranged so that any portion of the frequency channel equal in extent to the predetermined receiver bandwidth should include at least one instance of the band information; and
second circuitry configured to
receive the channel information;
detect the center frequency of each of the respective frequency channels; and
align the receiver bandwidth with one of the frequency channels using the detected center frequency, so as to receive, from within that channel, an instance of the band information, and then in response to the received band information, to align the receiver bandwidth so as to encompass the frequency band of the groups of sub-carriers carrying a data payload to recover a required data stream.

12. The receiver according to claim 11, further comprising:
third circuitry configured to detect any changes in receiver parameters indicated by a subsequent instance of the band information, wherein the second circuitry is further configured to alter receiver parameters for that data stream in response to the changes.

13. The receiver according to claim 12, further comprising:
a memory for storing receiver parameters to control operation of the receiver, wherein the third circuitry configured to update the memory in response to receiver parameters indicated by received instances of the band information.

14. The receiver according to claim 13, wherein, if receiver parameters relating to a required data stream are present in the memory, the receiver is configured to align the receiver bandwidth according to the receiver parameters stored in the memory.

15. A digital signal reception method, comprising:
receiving by circuitry a required data stream from a digital signal carrying multiple data streams by modulation of respective frequency bands of sub-carriers of one or more Orthogonal Frequency Division Multiplexed (OFDM) symbols each within a respective one of a group of frequency channels, the frequency bands occupying no more than a predetermined receiver bandwidth less than or equal to the channel width,
the digital signal carrying channel information defining a center frequency of each of the respective frequency channels and carrying at respective frequency positions within each frequency channel and repeated from time to time, multiple instances of band information defining receiver parameters including at least the frequency bands corresponding to all of the groups of adjacent sub-carriers of the one or more OFDM symbols which are carrying data payloads of the data streams within that frequency channel, the instances being arranged so that any portion of the frequency channel equal in extent to the predetermined receiver bandwidth should include at least one instance of the band information,
wherein the method further comprises capturing said at least one instance of the band information.

16. The digital signal reception method according to claim 15, further comprising:
receiving the channel information;
detecting the center frequency of each of the respective frequency channels;
aligning the receiver bandwidth with one of the frequency channels using the detected center frequency, so as to receive, from within that channel, an instance of the band information; and
in response to the received band information, aligning by circuitry the receiver bandwidth so as to encompass the frequency band of the groups of sub-carriers carrying of a data payload to recover a required data stream.

17. A digital signal receiver, comprising:
first circuitry configured to receive a required data stream from a digital signal carrying multiple data streams by modulation of respective frequency bands of sub-carriers or OFDM symbols, each within a respective one of a group of frequency channels, the frequency bands occupying no more than a predetermined receiver bandwidth less than or equal to the channel width,
the digital signal being arranged to carry at respective frequency positions within each frequency channel and repeated from time to time, multiple instances of band information carried by the sub-carriers of one or more OFDM symbols, the multiple instances of band information defining receiver parameters including at least the frequency bands corresponding to all of the data streams carried within that frequency channel, the instances being arranged so that any portion of the frequency channel equal in extent to the predetermined receiver bandwidth should include at least one instance of the band information;

wherein the first circuitry includes a tuner configured to align receiver bandwidth with a channel so as to receive, from within that channel, an instance of the band information, and then in response to the received band information, to align its receiver bandwidth so as to encompass the frequency band of the required data stream, the digital signal receiver being configured to receive, from within the channel, the instance of the band information by re-ordering sub-carriers of the one or more OFDM symbols if the bandwidth of the instances of band information and the receiver bandwidth and centre frequency are such that the higher sub-carriers of one instance of the band information and the lower sub-carriers of the next instance of band information are received, the re-ordering by the digital signal receiver providing a complete instance of the band information for demodulation and decoding.

18. The receiver according to claim 17, further comprising second circuitry configured to detect changes in receiver parameters indicated by a subsequent instance of the band information, wherein the first circuitry is further configured to alter receiver parameters for that data stream in response to the changes.

19. The receiver according to claim 17, further comprising:
 a memory for storing receiver parameters to control operation of the receiver; and
 second circuitry configured to update the memory in response to receiver parameters indicated by received instances of the band information.

20. The receiver according to 19, wherein, if receiver parameters relating to a required data stream are present in the memory, the first circuitry is arranged to align the receiver bandwidth according to the receiver parameters stored in the memory.

21. The receiver according to claim 19, wherein the second circuitry is further configured to detect, from within a currently detected channel, channel information defining the respective frequency channel for each data stream.

22. A digital signal reception method, comprising:
 receiving by circuitry a required data stream from a digital signal carrying multiple data streams by modulation of respective frequency bands of sub-carriers of one or more OFDM symbols each within a respective one of a group of frequency channels, the frequency bands occupying no more than a predetermined receiver bandwidth less than or equal to the channel width, the digital signal arranged to carry at respective frequency positions within each frequency channel and repeated from time to time, multiple instances of band information defining receiver parameters including at least the frequency bands corresponding to all of the data streams carried within that frequency channel, the instances being arranged so that any portion of the frequency channel equal in extent to the predetermined receiver bandwidth should include at least one instance of the band information;
 aligning the receiver bandwidth with a channel so as to receive, from within that channel, an instance of the band information; and
 in response to the received band information, aligning by the circuitry the receiver bandwidth so as to encompass the frequency band of the required data stream, wherein the aligning the receiver bandwidth with a channel so as to receive an instance of band information includes
 re-ordering sub-carriers of the one or more OFDM symbols if the bandwidth of the instances of band information and the receiver bandwidth and centre frequency are such that the higher sub-carriers of one instance of the band information and the lower sub-carriers of the next instance of band information are received, the re-ordering by the digital signal receiver providing a complete instance of the band information for demodulation and decoding.

\* \* \* \* \*